United States Patent [19]

Krueger

[11] Patent Number: 5,593,282
[45] Date of Patent: Jan. 14, 1997

[54] TURBOMACHINE ROTOR CONSTRUCTION INCLUDING A SERRATED ROOT SECTION AND A ROUNDED TERMINAL PORTION ON A BLADE ROOT, ESPECIALLY FOR AN AXIAL-FLOW TURBINE OF A GAS TURBINE ENGINE

[75] Inventor: Wolfgang Krueger, Reichertshausen, Germany

[73] Assignee: MTU Motoren- und Turbinen-Union Muenchen GmbH, Munich, Germany

[21] Appl. No.: 527,876

[22] Filed: Sep. 14, 1995

[30] Foreign Application Priority Data

Sep. 16, 1994 [DE] Germany ................... 44 32 999.7

[51] Int. Cl.[6] .................. F01D 5/30; F01D 5/20; F01D 5/28
[52] U.S. Cl. .................. 416/219 R; 416/248
[58] Field of Search .................. 416/219 R, 248, 416/230, 241 B, 241 R, 191

[56] References Cited

U.S. PATENT DOCUMENTS

| | | |
|---|---|---|
| 2,772,854 | 12/1956 | Anxionnaz . |
| 2,775,426 | 12/1956 | Barrett, Jr. et al. ............... 416/219 R |
| 2,920,864 | 1/1960 | Lee . |
| 3,756,745 | 9/1973 | Alver et al. ................. 416/219 R |
| 3,891,351 | 6/1975 | Norbut ................. 416/219 R |
| 3,955,898 | 5/1976 | Zaehring . |
| 4,076,455 | 2/1978 | Stargardter . |
| 4,142,836 | 3/1979 | Glenn ................. 416/219 R |
| 4,243,360 | 1/1981 | Wright ................. 415/191 |
| 4,417,854 | 11/1983 | Cain et al. ................. 416/219 R |
| 4,645,425 | 2/1987 | Morrison, Jr. ................. 416/219 R |
| 5,156,529 | 10/1992 | Ferleger et al. . |
| 5,211,540 | 5/1993 | Evans ................. 416/191 |
| 5,236,788 | 8/1993 | Manier et al. ................. 416/219 R |

FOREIGN PATENT DOCUMENTS

| | | |
|---|---|---|
| 2122353 | 6/1973 | Germany . |
| 2824853 | 12/1978 | Germany . |
| 614678 | 12/1948 | United Kingdom ............... 416/212 A |
| 813144 | 5/1959 | United Kingdom ............... 416/212 A |

*Primary Examiner*—Edward K. Look
*Assistant Examiner*—Michael S. Lee
*Attorney, Agent, or Firm*—W. G. Fasse; W. F. Fasse

[57] ABSTRACT

A rotor of a turbomachine includes blades having an improved blade root configuration for anchoring and centering the blade roots in axial slots of the rotor disk. Each blade root includes two portions or sections, namely a serrated section that has a single bilaterally uniformly shaped serration, and a terminal portion that has rounded surfaces and a narrower cross-section than the serrated root section. The serrated section provides anchoring against centrifugal forces. The terminal portion provides the predominant centering effect, for which it is radially movably received and located in a recess provided in the bottom of the slot. The special root configuration substantially avoids misfit and centering problems associated with manufacturing variances, whereby the blades and blade roots can be made of lightweight engineering materials.

17 Claims, 3 Drawing Sheets

TURBOMACHINE ROTOR CONSTRUCTION INCLUDING A SERRATED ROOT SECTION AND A ROUNDED TERMINAL PORTION ON A BLADE ROOT, ESPECIALLY FOR AN AXIAL-FLOW TURBINE OF A GAS TURBINE ENGINE

FIELD OF THE INVENTION

The invention relates to a rotor for a turbomachine and especially for an axial-flow turbine of a gas turbine engine, wherein the rotor blades are anchored by their serrated blade roots in correspondingly shaped axial grooves or slots in the rim of the rotor.

BACKGROUND INFORMATION

The use of high-alloy temperature-resistant materials for the rotor blades in gas turbine jet engines, e.g. in a low-pressure turbine, causes high rim loads on the rotor rim and therefore brings about a comparatively severe impairment of the rotor disk life. The rotor blades have a relatively high specific weight and are, for example, precision castings of nickel- or cobalt-base alloys. These rotor blades are normally anchored by their multiply serrated root sections, so-called pine-cone or fir-tree roots, in correspondingly contoured axial slots in the rotor rim.

With the above-described type of blade and blade root, the ever present tolerances or variances in the production of the serrated root and slot profiles practically do not cause any problems with regard to blade centering when the blades are made of high alloy materials. This is true because the above mentioned high-alloy blade materials provide sufficient ductility and flexural elasticity to compensate for production variances through relative local root deformation. In operation, therefore, surface support or contact occurs as expected at predefined bearing surfaces between the respective root serration and its companion slot surface. Disadvantageously, in order to cope with production variances and associated blade centering problems, while also withstanding the loads induced by prevailing forces, the above-described construction results in a statically indeterminate (overdetermined) arrangement.

Another disadvantage of the above-described known construction is that the manufacture of the blade roots and axial slots is complex and involves laborious and expensive processes.

The use of rotor blades made of light engineering materials, e.g. temperature resistant ceramics, would reduce the rotor disk rim loads. However, because they have inadequate ductility and flexural elasticity and are often prone to brittle fracture, these materials practically prohibit the use of the above mentioned fir-tree or pine-cone roots and profiles. In other words, the light engineering materials would not allow root deformation of the type that is necessary to compensate for production variances as described above.

It is generally known per se to provide rotor blades with dove-tailed roots. This type of root, however, cannot achieve a rotor blade centering effect like that achieved by the serrated pine-cone or fir-tree root. For lack of proper centering, such rotor blades, especially if they have comparatively long airfoils, tend to assume intolerably skewed positions relative to the required blade incidence angle.

OBJECTS OF THE INVENTION

In view of the above it is the aim of the invention to achieve the following objects singly or in combination:

to provide a rotor of the above-described general type in which external, centrifugal force-induced rim loads are low even at high rotational speeds;

to provide such a rotor in which a relatively simple root/slot configuration is used to properly center low-weight blades in the rotor rim;

to provide a particular root/slot configuration having two root/slot portions, one of which predominantly achieves proper blade centering and the other of which carries the arising centrifugally-induced loads;

to provide a particular root/slot configuration that does not rely on blade root deformation to compensate for manufacturing variances; and to provide a rotor blade of a light engineering material such as lightweight, temperature resistant ceramics, spherical or globular cell structure materials, or intermetallic phases or compounds, and having a special root/slot configuration adapted to use with such light engineering materials.

SUMMARY OF THE INVENTION

The above objects have been achieved in a rotor according to the present invention, wherein the rotor blades are all low-weight blades, and each blade root has two distinct zones or portions. The first zone or portion is a bilaterally symmetrical, serrated root section having a single serration. The second zone or portion is a symmetrical terminal portion having a reduced cross-section relative to the serrated root section and having rounded or radiused surfaces that are radially movably received in and located by a recess in the bottom of a rotor slot.

The invention thus achieves a blade root design that is relatively simple to manufacture. The local root profile with its root/slot serration and mating force-transfer surfaces is essentially designed to support the force loads resulting from the low-weight rotor blades, essentially without performing centering functions. The low-weight root is subject to no appreciable deformation from manufacturing variances. The blade centering function is assigned predominantly to the blade root's respective terminal portion, which absorbs the greatest part of the centering forces, in comparison to the bearing surfaces of the serration. The blade root of the present invention essentially provides a statically determinate bearing arrangement, whereby the achievable root centering action is comparable to that of a multiply serrated root (e.g. fir-tree root) used on heavy-weight blades of high-alloy blade materials.

The terminal portion is given radial freedom of motion by the existing assembly clearance of the root/slot serration, because the terminal portion is not fixed against radial motion in the recess. The radial guidance of the terminal portion in the recess also allows absorption of respective torsional moments that arise when the airfoils are braced with outer shrouds, for example, according to an advantageous combination of the present blades with a torsion-limiting or vibration-damping shroud structure.

The invention provides several advantageous variants of the basic root profiles using different embodiments of the terminal portion. For example, the terminal portion can be formed on a dovetailed blade root or a hammer-head shaped blade root, or the blade root can have a narrow neck section transitioning into the bilateral serrated section.

Alternative low-weight blade materials preferably suited for implementing the present invention include low-weight and temperature resistant ceramics, spherical or globular cell structure materials, and intermetallic phases and alloys thereof, such as titanium aluminides or nickel aluminides. The materials may be reinforced with fibers such as silicon carbide fibers.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
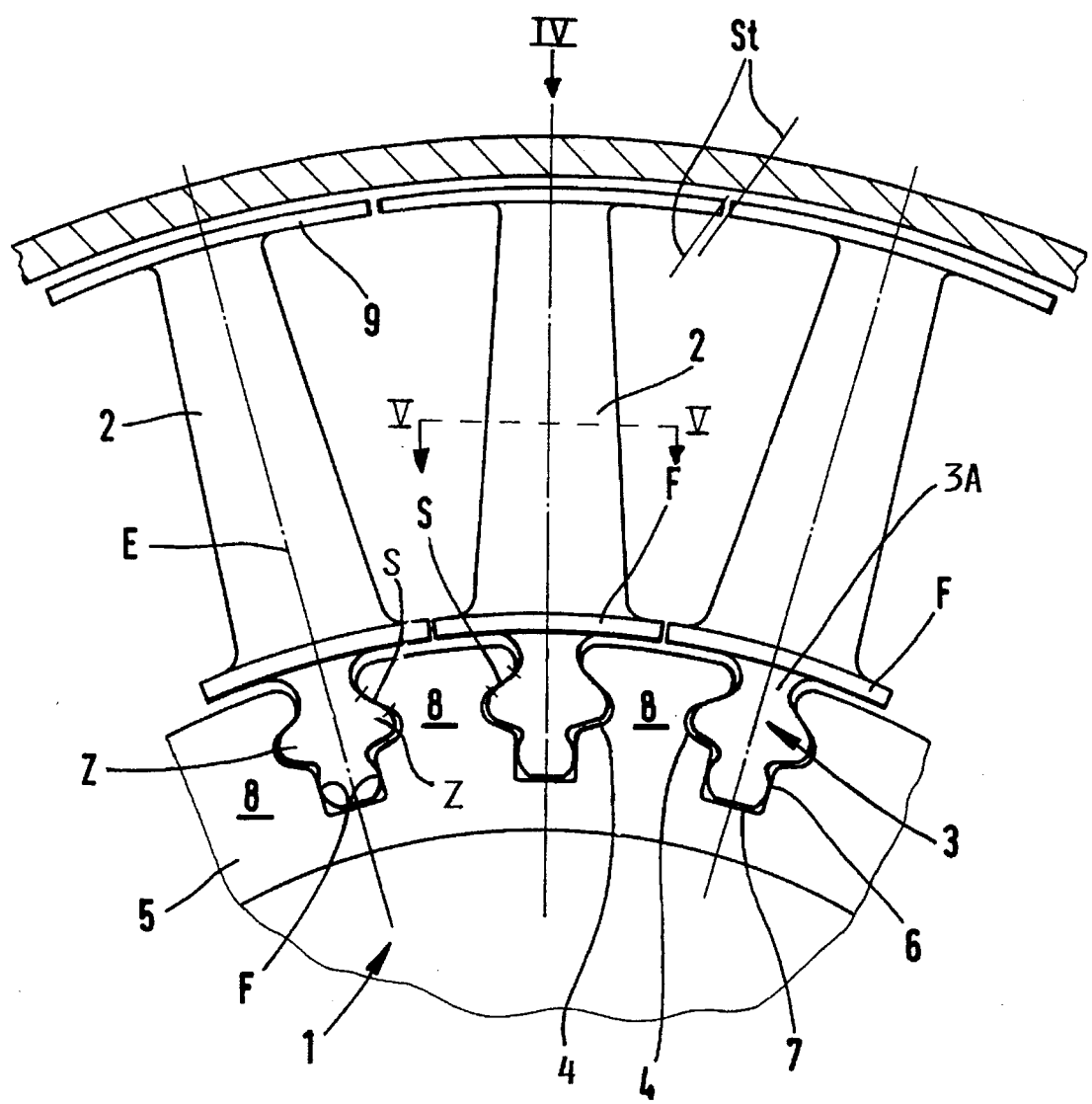
FIG. 1 is a frontal view of a cut-away portion of a rotor according to the invention, in a transversely sectioned turbine casing, showing three of several rotor blades that are circumferentially equally spaced around the rim of a rotor disk and are seated in axial slots therein.

FIG. 1 shows a rotor 1 of an axial-flow turbine of a gas turbine engine using a root-disk interconnection in accordance with the present invention. The rotor blades 2 are anchored by their blade roots 3 in correspondingly contoured axial slots 4 in the rotor rim 5. The rotor blades 2 are manufactured of a so-called light engineering material, which is described more fully below, so that the blades have a low weight, i.e. relatively low specific weight. On both sides of their respective longitudinal central planes of symmetry E, the respective blade roots 3 each uniformly have a single serration Z. In this example arrangement, the rotor blades 2 include pedestal plates F. Viewed radially inwardly, the blade roots 3 first transition from the pedestal plates F to a uniformly narrowed neck 3A, and then expand uniformly on both sides toward the local root serration Z. Up to this point, the root profile has an essentially dove-tailed shape. Each blade root 3 then symmetrically merges on the radially inward side into a terminal portion 6 that has bilaterally uniformly radiused or crowned surfaces F, that are radially movably guided and located in an axial recess 7 provided in the bottom of the slot 4. This provides the primary circumferential centering for each rotor blade 2.

Between each pair of circumferentially adjacent axial slots 4, disk lugs 8 remain on the rotor rim 5 and bilaterally form a uniform, serrated mating-surface profile for the serrations Z of the blade roots 3. The blade roots 3 are radially and circumferentially anchored and supported against the locally serrated sections of the disk lugs 8 at axial mating surfaces S, which are uniformly inclined relative to the longitudinal central plane of symmetry E. The dovetailed basic profile portions of the blade roots 3 with the serrations Z are designed to withstand the locally prevailing loads arising from applied forces, especially centrifugal blade forces.

Figure 3:
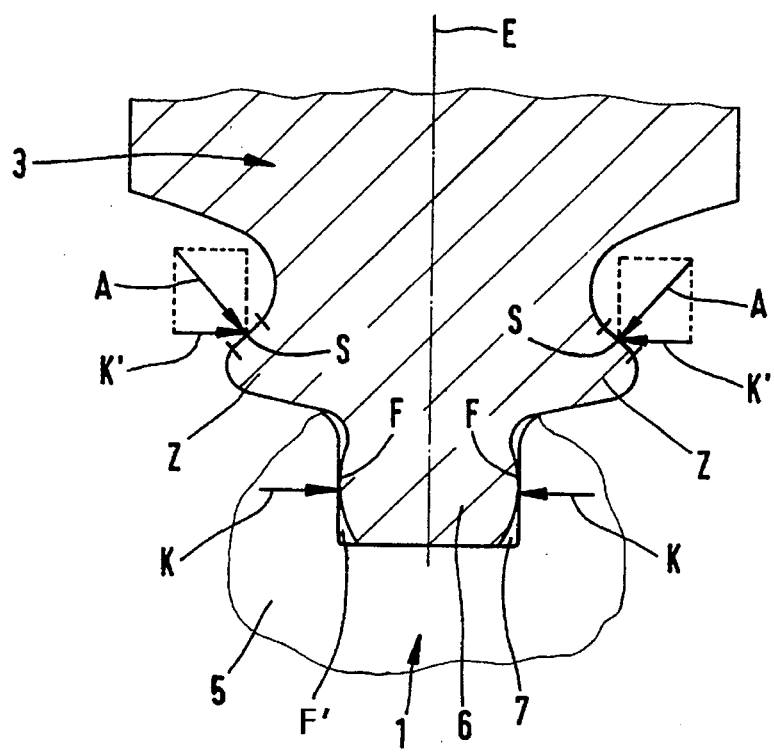
FIG. 3 is a sectional view of a cut-away root section of the inventive blade root arranged in a respective axial slot, with clarifying emphasis on the surface bearing arrangement for this root/slot geometry, which can be made nearly statically determinate with respect to local centering forces.

With reference now to the schematic sectional view of a blade root in FIG. 3, it can be seen that the blade centering function is predominantly served by the terminal portion 6 on each blade root 3. This is made clear by comparing the relatively large circumferential centering force components K acting on the terminal portion 6 to the relatively small centering force components K' still arising on the inclined mating surfaces S of the serrations Z. As shown by force vector parallelograms, the small centering force components K' are derived from the bearing forces A normal to the mating surfaces S. The root design in accordance with FIG. 1 and FIG. 3 thus produces an essentially statically determinate bearing contact along the mating surfaces S between root and slot, and axially linearly along the surfaces F of the terminal portion 6 and the companion surfaces F' of the axial recess 7.

In accordance particularly with FIG. 3, the respective terminal portion 6 comprises uniformly radiused or crowned surfaces F on both sides over its entire length. These rounded surfaces F provide an axial, essentially linear surface contact on the straight-walled inner surfaces F' of the recess 7.

Figure 2:
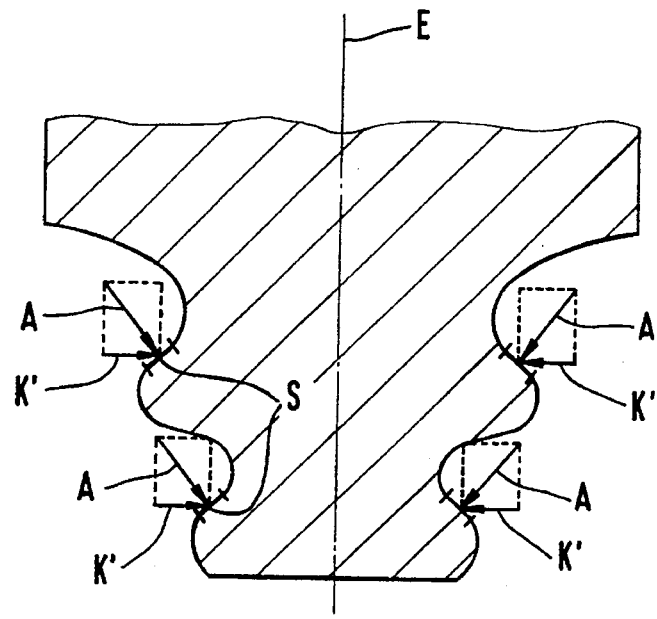
FIG. 2 is a sectional view of a cut-away root section of a conventional fir-tree rotor blade root arranged in a respective axial slot, with clarifying emphasis on the surface bearing arrangement for this root/slot geometry that is statically indeterminate with respect to local centering forces.

FIG. 2, using the same reference numbers and letters as FIGS. 1 and 3, illustrates a conventional fir-tree type of root with a statically indeterminate (overdetermined) root/slot bearing contact at the mating surfaces S. Since a plurality of root serrations are formed on both sides of the longitudinal symmetry plane E, a plurality of local centering forces K' results relative to the component bearing areas on the mating surfaces S. In order to consistently accommodate the plurality of centering forces K' acting on the plurality of serrations, especially in view of manufacturing variances, blade centering can only be achieved in operation by correspondingly pronounced root deformations.

Figure 4:
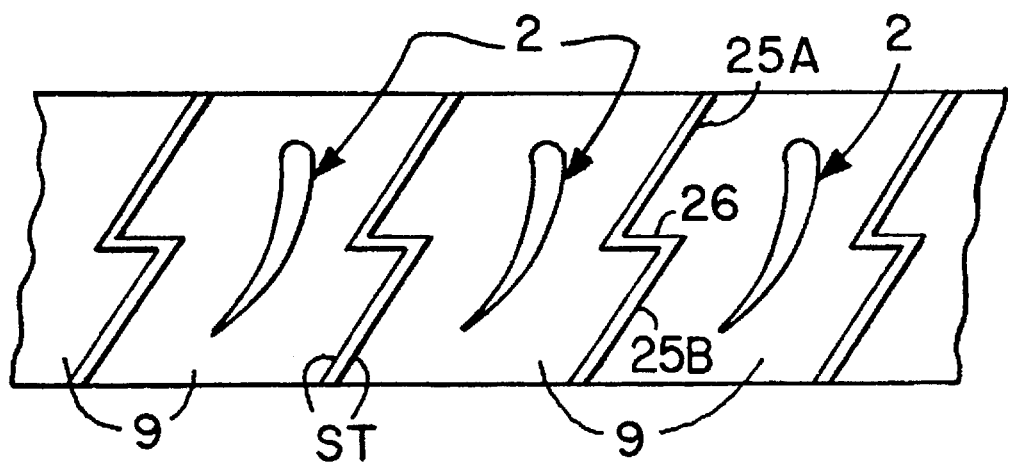
FIG. 4 is a projected radial view seen in the direction of arrow IV in FIG. 1, particularly showing a shroud construction.

With reference again to FIG. 1, the rotor blades 2 comprise shroud segments 9 at their radially outer ends to brace the blades circumferentially against one another during operation. The shroud segments 9 may also provide an anti-vibration and/or anti-torsion arrangement for the rotor blades 2, i.e. the shroud segments 9 may brace the blades 2 in a vibration-damping and/or torsion-limiting manner. To achieve vibration damping, the abutting edges of the shroud segments 9 can be designed to cancel vibrations through a certain amount of component friction, by means of chamfered abutting edge St in FIG. 1, for example. To achieve torsion limiting, the abutting edges of the shroud segments 9 can have a saw tooth-shape when viewed from above, as shown in FIG. 4. For example, the abutting edges St of adjacent shroud segments 9 can have sections 25A and 25B that are uniformly angled relative to the rotor axis and that extend offset from one another through respective countering transverse section 26. Such a sawtooth configuration, per se, is shown in the art.

The rotor blades 2 can be made of a low-weight temperature-resistant ceramic material. The ceramic material can be self-sintered or hot-pressed silicon carbide. The ceramic material can alternatively be reaction-sintered, self-sintered or hot-pressed silicon nitride.

The rotor blades 2 can alternatively be made of a low-weight temperature-resistant light engineering material of globular cell structure. In this context, the rotor blades 2 can be made of a material comprising a low-weight intermetallic phase or compound and alloys thereof. The phrase "globular" cell structure here means a material made of hollow spherical shells, for example. As a particular example, metallic hollow spherical shells are densely packed and roughly joined together by presintering. Thereafter, cavities between the shells can be filled with a metal alloy powder, whereupon the material is sintered to form intermetallic webs between the interstices left among the shells. Post-sintering at a suitable temperature then causes the presintered material of shells and filler powder to be firmly joined together by an intermetallic phase or compound to form a light engineering material. The intermetallic compound can be a titanium aluminide (TiAl), or alternatively a nickel aluminide (NiAl).

Figure 5:
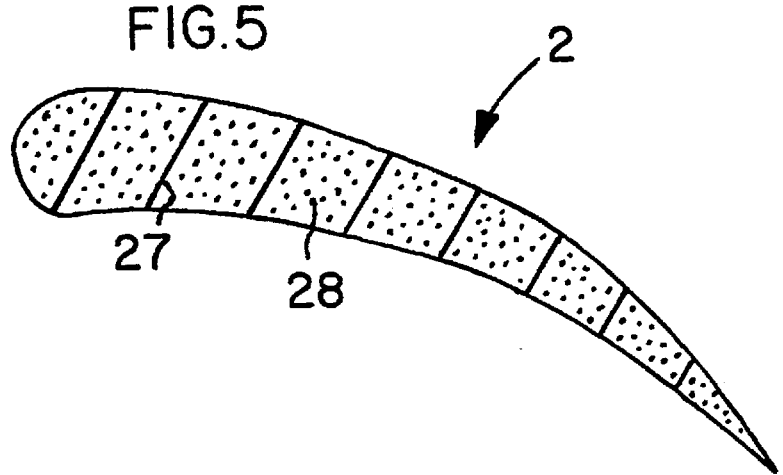
FIG. 5 is a section through a rotor blade along section line V—V in FIG. 1, particularly showing a fiber reinforced matrix material of the blade, which is especially a silicon carbide fiber reinforced titanium matrix.

Furthermore, the respective ceramic or intermetallic materials described above can be used as a matrix 27 that is strengthened with reinforcing fibers 28, as shown in FIG. 5, for example. The fiber-reinforced intermetallic matrix, e.g. based on NiAl or TiAl can be used as is or within the globular cell structure material as described above. In accordance with a further particular embodiment of a light engineering material, the matrix 27 may be a titanium matrix and the reinforcing fibers 28 may be silicon carbide fibers.

Although the invention has been described with reference to specific example embodiments, it will be appreciated that it is intended to cover all modifications and equivalents within the scope of the appended claims.

What is claimed is:

1. A rotor for a turbomachine, comprising a rotor disk having a plurality of axial slots spaced around a rim of said rotor disk, and a plurality of rotor blades each including an airfoil and a blade root that is anchored in a corresponding one of said slots, wherein each of said rotor blades is made of a lightweight material, each of said blade roots comprises a serrated root section and a terminal portion, said serrated root section has only a single bilaterally symmetrical serration, said terminal portion has bilaterally symmetrical rounded surfaces and a reduced root cross-section relative to said serrated root section, and each of said axial slots includes a serrated socket that matingly receives one of said serrated root sections and a recess at a radially inner end of said socket that receives one of said terminal portions so as to allow radial movement of said terminal portion in said recess.

2. The rotor of claim 1, wherein said serrated root section is a dovetail shaped root section.

3. The rotor of claim 1, wherein each of said recesses in said slots has flat sidewalls extending in axial and radial directions, and said rounded surfaces of each of said terminal portions of said blade roots extend entirely over a radial length of said terminal portion, and wherein said rounded surfaces are seated against said flat sidewalls.

4. The rotor of claim 3, wherein said rounded surfaces of each of said terminal portions are formed by an at least partially circular cross-section of said terminal portion.

5. The rotor of claim 1, wherein each of said blade roots further comprises a neck section having a reduced cross-section arranged between said airfoil and said serrated root section.

6. The rotor of claim 5, wherein said rounded surfaces of each of said terminal portions are formed by an at least partially circular cross-section of said terminal portion.

7. The rotor of claim 1, wherein said rounded surfaces of each of said terminal portions are formed by an at least partially circular cross-section of said terminal portion.

8. The rotor of claim 1, further comprising a shroud band arranged at radially outer tips of said airfoils so as to hold said airfoils in a manner that is at least one of torsion-limiting and vibration-damping.

9. The rotor of claim 1, wherein said lightweight material comprises a lightweight and temperature-resistant ceramic.

10. The rotor of claim 9, wherein said ceramic forms a matrix and said lightweight material further comprises reinforcing fibers embedded in said matrix.

11. The rotor of claim 1, wherein said lightweight material comprises a temperature-resistant lightweight engineering material having a globular cell structure.

12. The rotor of claim 11, wherein said lightweight material comprises at least one material selected from the group consisting of intermetallic compounds and alloys thereof.

13. The rotor of claim 1, wherein said lightweight material comprises at least one material selected from the group consisting of intermetallic compounds and alloys thereof.

14. The rotor of claim 13, wherein said selected intermetallic compound is a matrix and said lightweight material further comprises reinforcing fibers embedded in said matrix.

15. The rotor of claim 13, wherein said selected intermetallic compound comprises titanium aluminide (TiAl).

16. The rotor of claim 13, wherein said selected intermediate compound comprises nickel aluminide (NiAl).

17. The rotor of claim 1, wherein said lightweight material comprises a silicon carbide fiber reinforced titanium matrix.

\* \* \* \* \*